United States Patent Office 3,473,534
Patented Oct. 21, 1969

3,473,534
COILABLE SUN BLIND OF SEEING THROUGH TYPE
Juichi Sida, Morio Haki, and Tosiaki Yokoyama, Funabashi, Japan, assignors to Nihon Kentetsu Kabushiki Kaisha, Tokyo, Japan
Filed July 21, 1967, Ser. No. 655,212
Claims priority, application Japan, Apr. 6, 1967, 42/28,850
Int. Cl. E06b 9/10; A47h 23/08
U.S. Cl. 160—238                                   1 Claim

ABSTRACT OF THE DISCLOSURE

The disclosed coilable sun blind comprises a plurality of opaque plastic or metallic strips small in both width and thickness and disposed at predetermined equal intervals to form a stack with their surfaces upwardly oblique at predetermined equal angles relative to the main surfaces of the uncoiled sun blind. A plurality of pairs of flexible bonding straps made of a plastic or rubber-like material are bonded to each other and to both sides of the stack in substantial laterally spaced parallel relation and crosswise of the strips to sandwich them. A length of nonstretchable cord may be longitudinally embedded into one of the opposing bonding straps of each pair.

---

The invention relates to improvements in coilable sun blinds for use with windows of houses and buildings.

It is desirable to provide coilable sun blinds of the type referred to capable of not only shielding the light directly emitted from the sun but also making it difficult to cause a person or persons to see the interior of the associated room from the exterior while permitting a person or persons in the room to view the exterior in the substantially horizontal direction. Such sun blinds are also desirable to be well ventilated and usable as screens for preventing insects from entering into the associated rooms.

Accordingly it is an object of the invention to provide an improved coilable sun blind of seeing through type meeting the above mentioned requirements.

It is another object of the invention to provide an improved coilable sun blind of seeing through type capable of being easily mounted to a room's window, easy operated and requiring only a minimum space in its coiled position.

Briefly, the invention accomplishes the above cited objects by the provision of a coilable sun blind of seeing through type comprising a plurality of opaque plastic or metallic core members in the form of a strip small in both width and thickness disposed at predetermined equal intervals in substantially parallel relationship to form a stack with the surfaces thereof upwardly oblique at predetermined equal angles relative to the main surfaces of the uncoiled sun blind, and a plurality of pairs of flexible bonding members bonded to each other in pairs and to both sides of the stack in spaced parallel relationship and crosswise of the stack of the core members to sandwich the latter therebetween to form a unitary structure.

The invention will become more apparent from the following exemplary description taken in conjunction with the accompanying drawing in which.

Figure 1:
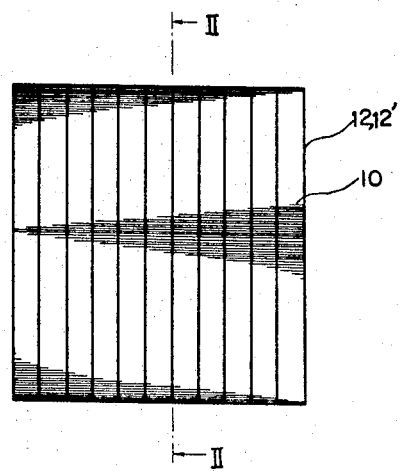
FIGURE 1 is a front elevational view of a sun blind constructed in accordance with the teachings of the invention and illustrated in its uncoiled position.
Figure 2:
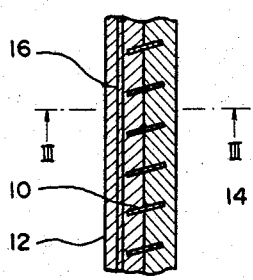
FIGURE 2 is a fragmental vertical sectional view taken along the line II—II of FIGURE 1.
Figure 3:
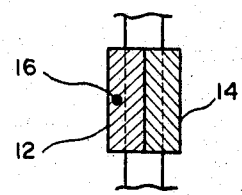
FIGURE 3 is a cross sectional view taken along the line III—III of FIGURE 2.

Referring now to the drawing, it is seen that a coilable sun blind illustrated comprises a plurality of core members in the form of strips 10 small in both width and thickness disposed at predetermined equal intervals and in substantially parallel relationship to form a spaced stack with the surfaces thereof upwardly oblique at predetermined equal angles relative to the main surface of the uncoiled sun blind. Each strip 10 is made of any suitable opaque material. Suitable examples of that material involve synthetic resins such as acrylate resins, vinyliden chloride resins, acrylonitrile butadien styrene resins, etc. and metals such as aluminum, brass, steel, etc.

In order to firmly hold the strips 10 in place, a plurality of pairs of opposing flexible bonding members 12 and 14 are applied on both sides of the stack of the strips 10 at predetermined intervals and crosswise of the strips to sandwich the latter therebetween. Each pair of the bonding members are bonded to each other and to the both sides of the stack into a screen-shaped structure by any suitable means. The bonding member can be made of a material selected from the group consisting of synthetic resins, for example, polyvinyl chloride resins, polystyrene resins, polyethylene resins, etc. and natural or synthetic rubber such as chloroprene rubber, silicone rubber, urethane rubber, etc. Bonding of the bonding straps 12 and 14 made of any of such materials may be accomplished by fusing or vulcanization process as the case may be.

If it is desired to prevent an elongation of the sun blind during service a length of cord 16 may be longitudinally embedded into one of the flexible bonding members in this case the member 12 of each pair. The strap is preferably made of any suitable material low in elongation such as cotton, hemp, nylon, etc.

As an example, the aluminum strips were in the order of 2.0 mm. in width and in the order of 0.3 mm. in thickness. The strips 10 were disposed at fixed equal intervals of 2.0 mm. with the surfaces thereof upwardly oblique at fixed equal angles on the order of 17 degrees to the direction normal to the main surfaces of the uncoiled sun blind. Thereafter a plurality of bonding members in order of 3.0 mm. wide and on the order of 2.0 mm. thick were applied to both sides of the stack of strips at fixed equal intervals of approximately 100 mm. so as to sandwich the strips therebetween and then bonded to each other and to the stack to provide a screen-shaped structure. It is to be understood that the invention is not restricted to the figures just specified.

From the foregoing it will be appreciated that the objects of the invention have been accomplished by the provision of a sun blind having a screen-shaped structure in which a plurality of opaque core members upwardly directed in spaced parallel relationships and held in place by a plurality of flexible bonding member. Further it will be appreciated that because of flexible bonding members the present sun blind can be rolled into a small diameter. The present sun blind can be used in the similar manner as does the well known roll type of sun blind. In addition the sun blind is small in dimension and can be operated in easy manner as compared with the conventional Venetian blinds.

What we claim is:

1. A flexible and coilable sun blind of the see through type comprising a plurality of strips of opaque material stacked at predetermined equal intervals, in substantially parallel relationship and tilted upwardly at predetermined equal angles relative to the main surface of the uncoiled sun blind, a plurality of pairs of flexible bonding members in the form of straps bonded to each other in pairs and to both sides of the arrayed strips in substantial, laterally spaced parallel relationship and crosswise of the arrayed strips to sandwich the latter therebetween to form a unitary structure, and a length of cord having low elongation characteristics is longitudinally embedded within one of the flexible bonding members of each pair.

References Cited

UNITED STATES PATENTS

| 1,268,145 | 6/1918 | Pease | 156—99 X |
| 2,382,566 | 8/1945 | Heckman | 156—99 X |
| 2,659,686 | 11/1953 | Watkins | 52—616 X |
| 2,745,150 | 5/1956 | Warns | 52—616 X |
| 3,146,155 | 8/1964 | Trenner. | |
| 3,324,620 | 6/1967 | Requema | 52—473 X |
| 2,852,143 | 9/1958 | Taber | 160—238 X |
| 2,855,241 | 10/1958 | Walter | 160—234 |
| 3,338,290 | 8/1967 | Servis | 160—238 |
| 3,363,666 | 1/1968 | Hodgson et al. | 160—238 X |

PETER M. CAUN, Primary Examiner